March 13, 1956  M. L. SHEELY ET AL  2,738,335
METHOD OF PRODUCING SOLID SOAP PRODUCTS FROM
POTASH SOAPS AND PRODUCTS OBTAINED THEREBY
Filed Jan. 24, 1952
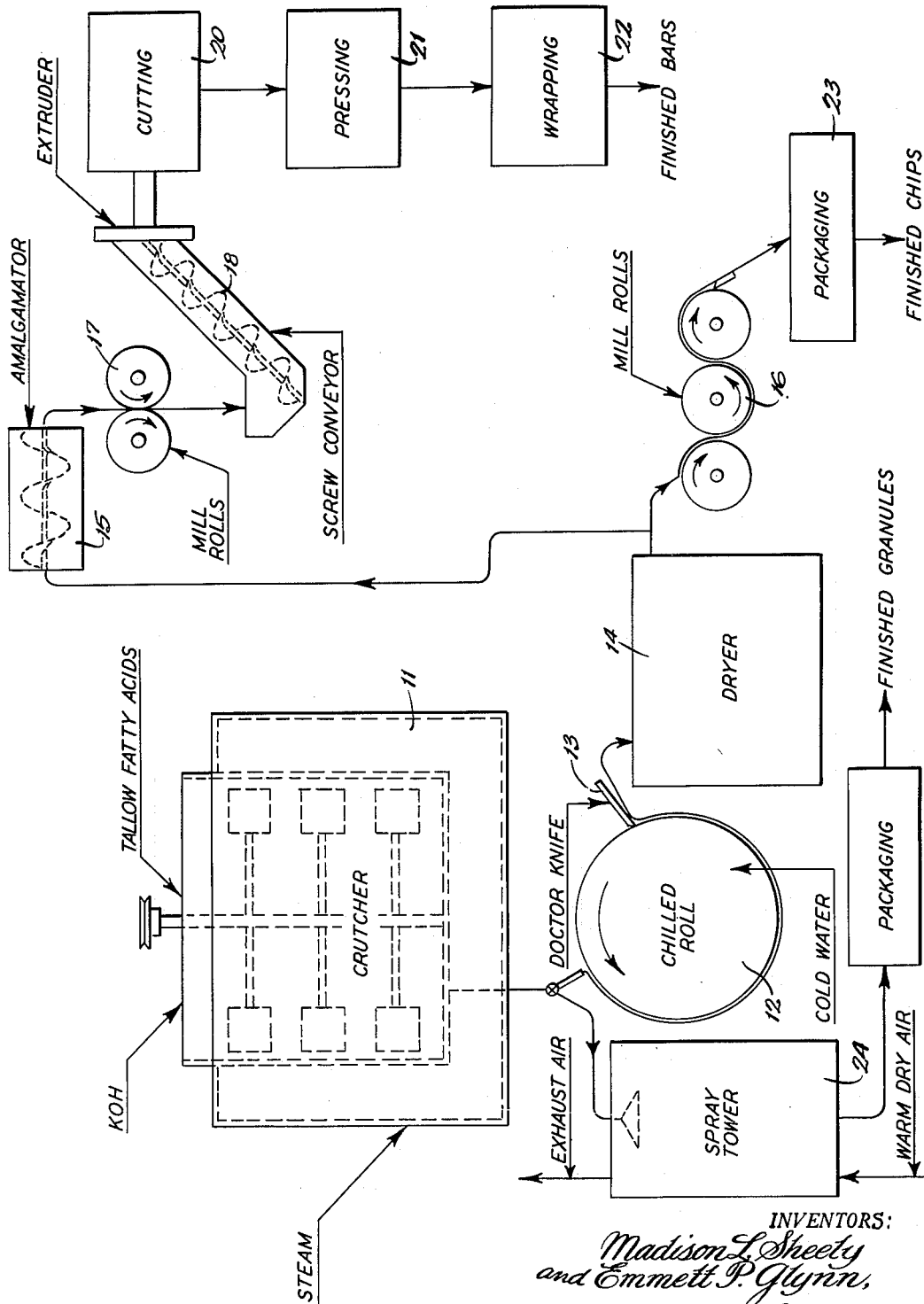
INVENTORS:
Madison L. Sheely
and Emmett P. Glynn,
BY Carl C. Batz
ATTORNEY.

United States Patent Office 2,738,335
Patented Mar. 13, 1956

2,738,335

METHOD OF PRODUCING SOLID SOAP PRODUCTS FROM POTASH SOAPS AND PRODUCTS OBTAINED THEREBY

Madison L. Sheely, Western Springs, and Emmett P. Glynn, Chicago, Ill., assignors to Armour and Company, Chicago, Ill., a corporation of Illinois Application January 24, 1952, Serial No. 268,114

6 Claims. (Cl. 252—368)

This invention relates to a method of producing solid soap products from potash soaps, and to the products produced by the method. This invention has particular utility in producing solid potash soap in the form of bars, chips, and granules.

Soap can be defined as a salt of one or more of the higher fatty acids with an alkali or metal. Most soaps are made by the action of sodium or potassium hydroxide on fats and oils. The potassium and sodium soaps are commonly referred to respectively as potash and soda soaps. When soaps are prepared directly from the raw oils or fats by the use of potassium or sodium hydroxide the reaction is referred to as saponification, since it involves the splitting of the triglycerides of the fatty acids to form glycerin and the alkali metal salts of the fatty acids found in the particular oil or fat. Soap can also be made by a neutralization reaction between sodium or potassium hydroxide and free fatty acids, which are obtained from the fats or oils by various processes. Therefore, for purposes of convenience, soaps composed of potassium salts of the fatty acids will be referred to hereinafter as potassium soaps, while soaps composed of sodium salts of fatty acids will be referred to as sodium soaps. It will therefore be apparent that both sodium and potassium soaps can be prepared by saponification or neutralization reactions, depending on whether the starting material contains the triglycerides or the free fatty acids.

At the present time, commercial solid soap products are mainly sodium soaps. In fact, nearly all solid soaps, and in particular solid soaps in the form of bars and granules, are composed entirely of sodium soaps. However, in the case of solid soap in the form of flakes, it is the general practice, especially in the case of the fine fabric flakes, to incorporate at least 10 but not over 30% by weight potassium soaps to improve the solubility of the sodium soaps, and to decrease the brittleness of the chips.

In the production of soaps, and in particular solid soaps, the main fat employed is tallow, while coconut oil is also extensively used. Tallow is a much less expensive raw material than coconut oil, and therefore it would be desired to use tallow exclusively, if it were possible to do so and obtain a satisfactory product. However, it has been found necessary to combine between 10 and 35% by weight coconut oil soaps with the tallow soaps to enhance the solubility and sudsing characteristics of the tallow base soaps.

Potassium soaps are commonly referred to as soft soaps, because of their great affinity for water, and because they are prepared and marketed in the form of liquid or paste soap products, rather than in the form of hard soaps. For example, liquid soaps for use in dispensers are usually made from coconut oil using 100% caustic potash saponification. So-called "green soaps" are paste products made with soft oils or fatty acids and 100% caustic potash saponification. Shaving creams usually contain substantial percentages of coconut oil and hard fats or fatty acids saponified with caustic potash. With the exception of soap flakes or chips, mentioned above, hard soap products are not formulated with any potassium soaps, and even in the case of soap chips only a minor proportion of potassium soaps are combined with the sodium soaps.

Probably the primary reason for the failure of the soap industry to market potassium base soaps in solid form is due to their hygroscopicity. This defect of potassium soaps has long been recognized. They have a much greater affinity for water than sodium soaps, and tend to take up water from the atmosphere when exposed thereto. Also, in bar form, potassium soaps tend to soften excessively on contact with water. When potassium soaps are prepared in the form of chips or granules, the greater area of exposed surface accentuates the effect of the hygroscopic tendency of the soap. However, aside from this defect, the potassium soaps have desirable properties which are comparable to and in some ways superior to sodium soaps. For example, potassium soaps go into aqueous solution at much lower temperatures than sodium soaps.

It is therefore an object of this invention to provide a method for producing potash soaps in the form of solid soap products which will overcome the objectionable hygroscopic tendency of potassium soaps. It is a further object of this invention to develop modifications in the procedure of manufacturing sodium soap products which will allow the solid potassium soap products to be prepared with the same equipment. Further objects and advantages will appear as the specification proceeds.

This invention is based on the discovery that by reducing the moisture content of solid potassium base soaps below a critical value that the objectionable hygroscopic tendency of the soap material is substantially eliminated regardless of the extent of the surface area of the soap exposed to the atmosphere, with the result that when potassium soaps are dried below this critical limit they can be marketed in any desired form, such as bars, chips, and granules.

Heretofore, it has been the practice to prepare solid soap products in a manner that will assure that the final solid soap product contains a relatively high percentage of water. For example, toilet soap in bar form and washing soap in granule form contain between 10 to 15% moisture; soap in the form of chips contains from 10 to 20% moisture; and laundry soap in bar form contains up to 30% moisture. It can be stated in general that solid sodium soaps must contain at least about 10% water to give satisfactory results in both manufacturing and commercial use. This amount of water is required in the soap during processing to allow the milling operations to be carried out without hardening and powdering the soap. Also, if the finished product contained less than about 10% water, it would not be sufficiently soluble to give satisfactory results under ordinary conditions of use.

During the experimental work leading to this invention, it had been determined that potassium soaps containing an amount of water corresponding to the amount allowed to remain in sodium soaps cannot be used to produce satisfactory solid soap products, such as bars, chips, and granules. When solid potassium soap products are formulated in a similar manner to sodium soap products they are found to exhibit an objectionable hygroscopic tendency. However, it has now been determined that if the moisture content of the potassium soap is reduced to at least 4% and preferably to 3.5% by weight or below, that the objectionable hygroscopic tendency of the soap is substantially eliminated. This appears to be true regardless of the extent of the surface area of the soap exposed to the atmosphere. Therefore, by reducing the moisture content of potassium soap to at least 4%, the soap can be marketed in any desired form, such as bar, chips, and granules. While the moisture content can be reduced to a very low value, say 1%, with satisfactory results, it is believed that completely anhydrous potassium soaps are not as desirable as the potassium soaps containing a critically small amount of moisture. Therefore, it is desired that the potassium soaps contain from about 1 to 4% moisture, and preferably between about 2 to 3.5% moisture.

Although the experience with solid sodium soaps would have indicated that the reduction of the water content of potassium soaps to less than 4% would have rendered the normal milling procedures extremely difficult, this has not proven to be the case. Potassium soaps containing less than 4% moisture can be milled according to the usual procedures without undue hardening or powdering of the soap. Also, it has been determined that the reduction of the moisture content does not unduly impair the solubility of the potassium soaps.

The same equipment now used for preparing solid sodium soaps can be employed for preparing the solid potassium soaps according to this invention. However, certain variations in the procedure have been found highly advantageous in producing satisfactory products. Therefore, it will be necessary to briefly describe the main operations and equipment employed by most manufacturers of sodium soap. The accompanying drawing shows a typical flow sheet in simplified form for the preparation of solid soap products; namely, bars, chips, and granules. In the illustration given, the potassium hydroxide and tallow fatty acids are shown being charged to a crutcher 11, which is a special type of steam-jacketed agitator. Potassium soaps can also be prepared by saponification of the triglycerides, but special and relatively expensive procedures are required to separate the glycerine. If a substantial amount of glycerine was left in the soap, it would defeat the purpose of the present invention, since glycerine has been found to affect the hygroscopicity of potash soaps in a manner similar to water. Upon the completion of the chemical reactions within the crutcher, and thorough mixing of the soap therein, the molten soap is flowed onto a chilled roll 12, which is generally associated with a small roll (not shown) which together roll the soap into a large flat sheet about the large roll. This sheet of soap is then cut into ribbons by a series of metal protrusions on the doctor knife 13. These ribbons are removed by the doctor knife and conveyed to a dryer 14, in which the moisture content of the soap is reduced to the desired value for the subsequent operations and in the finished product.

After the ribbons of soap are dried to the desired moisture content, they are either passed to an amalgamator 15 or to a mill 16, depending on whether it is desired to form the ribbons into bars or chips. If bars are desired, the ribbons are passed to the amalgamator 15, which is a specialized type of mixer in which perfume and other substances can be added. Upon leaving the amalgamator the soap is passed through a series of devices which further knead and mix the soap. These may take the form of mill rolls 17 and screw conveyor 18. Upon leaving the upper end of screw conveyor 18, the soap is extruded through a die extruder member 19. The extruded soap is then further processed to produce the finished bars by cutting at 20, pressing at 21, and wrapping at 22.

If chips or flakes are desired instead of bars, the dried ribbons are passed from dryer 14 to mill 16. In the illustration given, the mill is indicated as consisting of several rotatably-mounted cylindrical drums. These cylindrical drums or rolls are so mounted that the soap from the dryer 14 is passed on to the rolls. These rolls exert a pressing and polishing action on the dried ribbons. If desired, this mill may be equipped to take the flakes off as ribbons or, if desired, in a diamond shape. From the mill the finished chips or flakes are passed to packaging at 23.

The preparation of granules follows a somewhat different procedure in that the molten soap from crutcher 11 is passed to a spray tower 24. The molten soap is sprayed into the top of the tower and allowed to fall downwardly against a stream of warm dry air moving upwardly within the tower. This forms the drops of soap into granules, and at the same time dries the granules of soap. By regulating the temperature and volume of the air flow through the tower, it is possible to produce granules having the desired moisture content.

While the above discussion of the processing of soap is considerably simplified, it does set forth the important steps in the process which particularly relate to the present invention.

It is now desired to discuss the modifications required in the processing of potassium soap on conventional equipment of the type illustrated in the drawing from that used for sodium soap.

The same fatty starting materials can be employed for producing potassium soaps as for producing sodium soaps. For example, tallow or coconut oil can be employed, or the free fatty acids derived therefrom. Tallow is composed mainly of triglycerides of fatty acids containing from 16 to 18 carbon atoms. As high as 40 to 50% of the fatty acids in tallow may be unsaturated. The saturated fatty acids found in tallow are mainly palmitic and stearic, while the unsaturated acids are oleic and linoleic. The fatty acid composition of coconut oil is somewhat different in that the main fatty acids found therein contain from 12 to 14 carbon atoms. These acids are respectively myristic and lauric. Therefore, it can be seen that a mixture of the potassium salts of coconut fatty acids and tallow fatty acids will be composed mainly of potassium salts of fatty acids containing from 12 to 18 carbon atoms.

As a result of the investigations leading to this invention, it has been discovered that potassium soaps prepared exclusively from tallow fatty acids have properties which are substantially the equivalent of the ordinary commercial grades of sodium soaps which are tallow base soaps but in addition contain from 10 to 30% of coconut oil soap. In view of the much greater cost of coconut oil compared to tallow, it is preferred to prepare the potassium base soaps of this invention exclusively from tallow. These potassium base soaps can be formed entirely of potassium soap, or can contain a minor proportion of sodium soaps. However, there does not appear to be any particular advantage in combining the sodium and potassium soaps, since the potassium soaps, when dried in accordance with this invention, are no more hygroscopic than similar sodium soaps, and are otherwise the equivalent of the sodium soaps in such proper ties as detergency, suds volume, and solubility. In addition, the potassium soap possesses the advantage of being able to go into solution at a considerably lower temperature than the sodium soap.

It has been found that there is another factor which has some effect on the hygroscopicity of the potassium soaps. This factor is the titer of the fatty raw material. Titer is a standard test for fats and oils in which the sample is completely saponified, and the solidifying point (or titer) of the resulting separated and washed fatty acids are determined. In preparing solid potassium soaps from tallow, it has been determined that when the tallow has a relatively high titer the hygroscopic tendency of the finished soap is somewhat reduced. The titer of tallow or other fat can be increased by hydrogenation, if its titer is lower than desirable. Also, a mixture having the desired titer can be prepared by the mixing of a low titer stock with a high titer stock. Generally in the manufacturing of sodium soaps, the titer of the tallow is not regarded of particular importance. In preparing solid potassium soaps from tallow, it is desirable to have the titer of the tallow at least 40° C. and preferably at least 43° C. Completely hardened tallow is undesirable, and it is probable that it will not be desirable to use tallow having a titer much above 50° C. The optimum range is from about 43 to 47° C.

In the processing of sodium soaps, it is the general practice to have from 32 to 34% moisture in the molten soap when it is in the crutcher. For some reason, which is not clearly understood, it has been found that even at this early point in the processing of the potassium soaps it is very desirable to have the moisture content reduced to at least 23% and preferably to 21%. The moisture content of the soap in the crutcher can be regulated by controlling the amount of water charged to the crutcher, or by evaporating some of the water from the molten soap. By keeping the moisture content of the melted soap in the crutcher below 23%, it has been found that there is a considerable increase in the jell strength of the material, which assists in forming the soap on the chilled roll.

In the applying of melted sodium soaps to the surface of a chilled roll to form a sheet thereon, it is generally sufficient to have the surface of the chilled roll at a temperature between about 62 and 68° F. This temperature range, however, has proven to be much too high in processing potassium soaps. To achieve satisfactory results, it is preferable to have the temperature of the chilled roll below about 40° F. For example, the cold water used to chill the roll can be supplied at a temperature of between 35 and 40° F.

As indicated above, in preparing solid potassium soaps the major departure from the procedure used in preparing solid sodium soaps is the drying of the potassium soaps to less than about 4% moisture content. The reasons for drying the soap to below this critical moisture content have already been discussed. It will be apparent from an examination of the flow sheet shown in the accompanying drawing that when the potassium soap is to be formed into bars or chips that the required drying of the soap can easily be carried out in the dryer to which the soap is passed in the form of ribbons. Also, when the potassium soap is to be prepared in the form of granules, the temperature and volume of drying air passed through the spray tower can be adjusted to give the required moisture content.

In order to better illustrate this invention, it is desired to set out the following illustrative example.

*Example*

Employing equipment similar to that illustrated in the flow sheet of the drawing, 1,000 pounds of tallow fatty acids having a titer at 45° C. was charged to the crutcher together with sufficient potassium hydroxide to completely neutralize the acids. After the completion of the neutralization reaction, the molten soap containing around 21% moisture was thoroughly mixed. Part of the molten soap was then applied to the usual chilled roll which was maintained at a temperature of between about 35 to 40° F. The sheet of soap on the chilled roll was cut into ribbons by the usual procedure and passed to a dryer in which its moisture content was reduced to about 3.5%. Finished chips and finished bars were then prepared from the dried ribbons according to the usual procedures. The rest of the molten soap was passed from the crutcher to a spray tower in which it was formed into granules by the usual procedure. The temperature and volume of the drying air were adjusted to produce a moisture content of about 3.5% in the finished granules.

The finished bars, chips, and granules were tested to determine their properties. A standard commercial sodium base soap was used for comparison containing 79% tallow soap and 21% coco soap. The titer of the combined tallow and coconut oil prior to saponification was 39° C. It was found that the potassium soap showed equal or slightly superior detergency on wool and cotton to the standard commercial sodium soap. In another comparison test, the potassium soap showed approximately equal suds value to the commercial sodium soap. However, in a solubility test, the potassium soap proved to be slightly more soluble than the sodium soap.

The hygroscopicity of the potassium soap in the form of bars, chips, and granules was determined by exposure of the solid products to a moist atmosphere, and it was determined that they were no more hygroscopic than the standard commercial sodium base soap in the same form.

The investigations leading to this invention have confirmed that solid potassium soaps have a number of important advantages over the conventional solid sodium soaps. One of these advantages is that when dirt is removed from a surface by the action of a potassium soap, it is much less likely to be redeposited on the surface than when sodium soap is used. In other words, the redeposition factors of potassium soaps are in general considerably lower than sodium soaps. Another important advantage of potassium soaps is that they can be used with a high degree of effectiveness in sea water, as compared to sodium soaps.

As indicated above, it has been determined that solid potassium soaps made exclusively from the fatty acids of tallow do not suffer from the same disadvantages as sodium soaps prepared exclusively from tallow. It is therefore unnecessary to employ coconut oil fatty acids to produce a good solid product of potassium soap. Potassium soaps prepared exclusively from tallow fatty acids possess certain resultant or collateral advantages. One of these is that they are less irritating to the skin, since coconut oil fatty acids tend to be more irritating than tallow fatty acids. A further advantage of potassium soaps prepared without the use of coconut oil fatty acids is that the production of good soap is rendered independent of imported raw materials. All of the coconut oil required to meet the domestic demand must be imported into the United States. With the present world situation it can be readily appreciated that a technological advance permitting high quality solid soaps to be prepared without the use of coconut oil represents an important contribution to the economy.

While in the foregoing specification specific details of this invention have been set forth for purposes of illustration, it will be readily apparent to those skilled in the art that many of these details can be varied widely without departing from the spirit of our invention.

We claim:

1. The method of producing a solid soap product from tallow fatty acids, comprising converting tallow fatty acids having a titer of at least 40° C. to their potassium salts to obtain a potassium tallow soap containing considerably greater than 4% by weight of water, reducing the water content of said potassium tallow soap to within the range of 1 to 4% water by weight, and forming said potassium tallow soap into a solid soap product in marketable condition, said solid soap product being composed substantially entirely of said potassium tallow soap while being substantially non-hygroscopic.

2. The method of producing a solid soap product from tallow fatty acids, comprising converting tallow fatty acids having a titer of from 43 to 47° C. to their potassium salts to obtain a potassium tallow soap containing considerably greater than 4% by weight of water, reducing the water content of said potassium tallow soap to within the range from 2 to 3.5% water by weight, and forming said potassium tallow soap into a solid soap product in marketable condition, said solid soap product being composed substantially entirely of said potassium tallow soap while being substantially non-hygroscopic.

3. A solid soap product in marketable form, consisting substantially entirely of potassium tallow soap composed of potassium salts of tallow fatty acids having a titer of at least 40° C. in admixture with from 1 to 4% by weight of water.

4. A solid soap product in marketable form, consisting substantially entirely of potassium tallow soap composed of potassium salts of tallow fatty acids having a titer of from 43 to 47° C. in admixture with from 2 to 3.5% by weight of water.

5. The method of claim 1 in which said potassium tallow soap prior to said water-reducing step is in the form of a molten material containing less than 23% water by weight, and is further processed by applying said molten material to the surface of a chilled roll to form a sheet thereon, cutting said sheet to obtain ribbons of said material, and performing the water-reduction step of said claim 1 by drying said ribbons.

6. The method of claim 5 in which said chilled roll is maintained at a temperature between about 35 to 40° F. during the application of said soap material thereto.

References Cited in the file of this patent

UNITED STATES PATENTS

| 2,087,788 | Thal | July 20, 1937 |
| 2,594,956 | Marshall | Apr. 29, 1952 |

FOREIGN PATENTS

| 486,819 | Great Britain | June 10, 1938 |

OTHER REFERENCES

Ser. No. 107,398, Welter (A. P. C.), published May 24, 1943.